Oct. 25, 1932.   C. M. BAKER   1,885,069
MANURE COLLECTING DEVICE FOR BARNS
Filed April 3, 1931   5 Sheets-Sheet 3

C. M. Baker, INVENTOR
BY Arthur L. Evans
ATTORNEY

Oct. 25, 1932.  C. M. BAKER  1,885,069
MANURE COLLECTING DEVICE FOR BARNS
Filed April 3, 1931  5 Sheets-Sheet 4
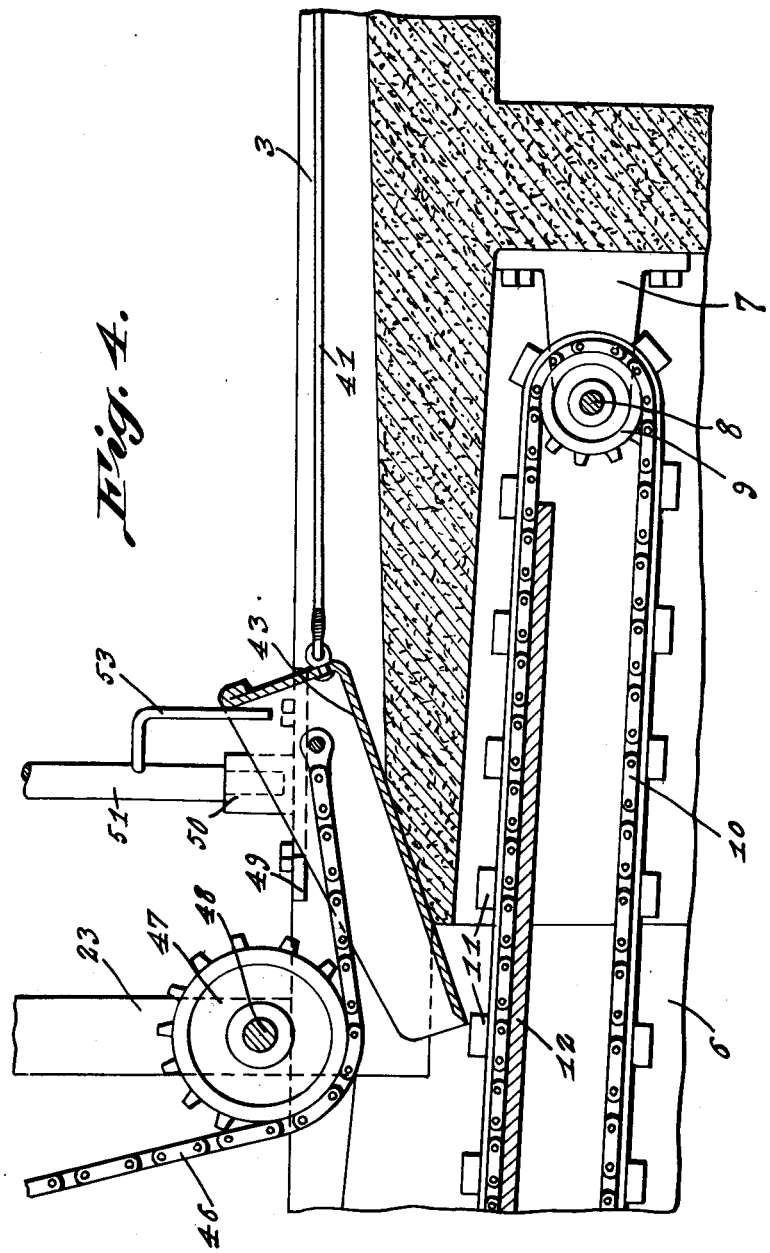
C. M. Baker, INVENTOR
BY Arthur L. Evans
ATTORNEY

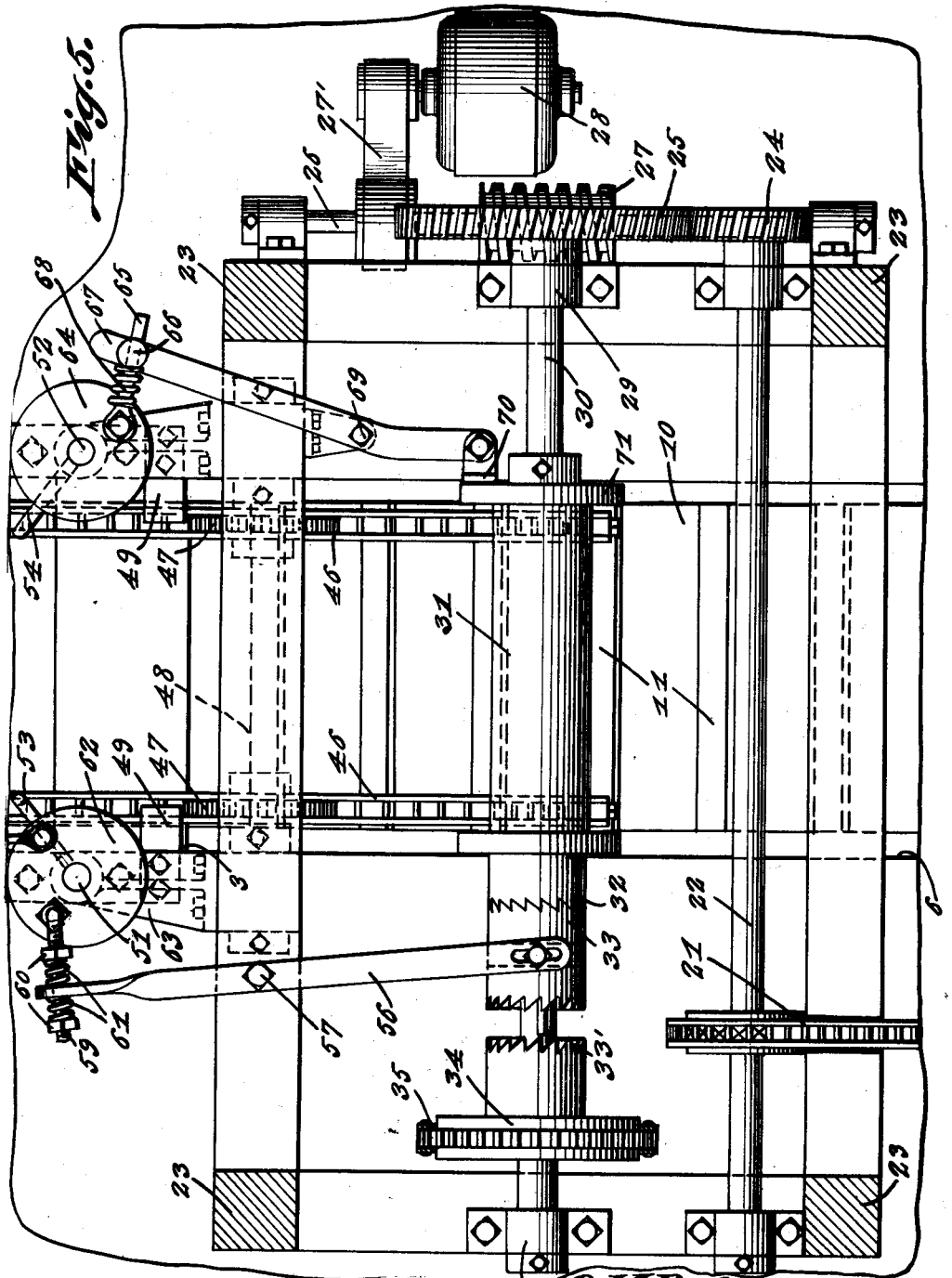

Patented Oct. 25, 1932

1,885,069

UNITED STATES PATENT OFFICE

CHARLES M. BAKER, OF YOUNGSTOWN, OHIO

MANURE COLLECTING DEVICE FOR BARNS

Application filed April 3, 1931. Serial No. 527,569.

My present invention has reference to an improved cow barn or stable, my object being to provide the barn or stable with automatically operated means for removing manure therefrom and thereby rendering the barn or stable more sanitary than is usual.

A further object is the provision of means for directing manure from a stable onto a conveyor and from thence onto an elevator, where the said manure may be delivered into a wagon or to a pile located away from the stable, all of the means being motor driven and simultaneous in action.

A still further object is the provision of a means for this purpose wherein a scoop is caused to travel through a gutter in the barn or stable, which gutter is located transversely with respect to the stalls for the cows, and which gutter has arranged for travel therein a scoop, there being motor operated means for moving the scoop from one end of the gutter to the second or delivery end thereof, means for canting or tilting the scoop to dump the contents thereof onto a conveyor which delivers onto an elevator, and means for returning the scoop to its initial position, all of said means being automatically operated by mechanism driven by a motor.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Figure 4 is a detail enlarged sectional view to illustrate the manner in which the scoop is tilted to deliver the contents thereof onto the conveyor.

Figure 5 is a greatly enlarged sectional view approximately on the line 5—5 of Figure 3.

Figure 1:
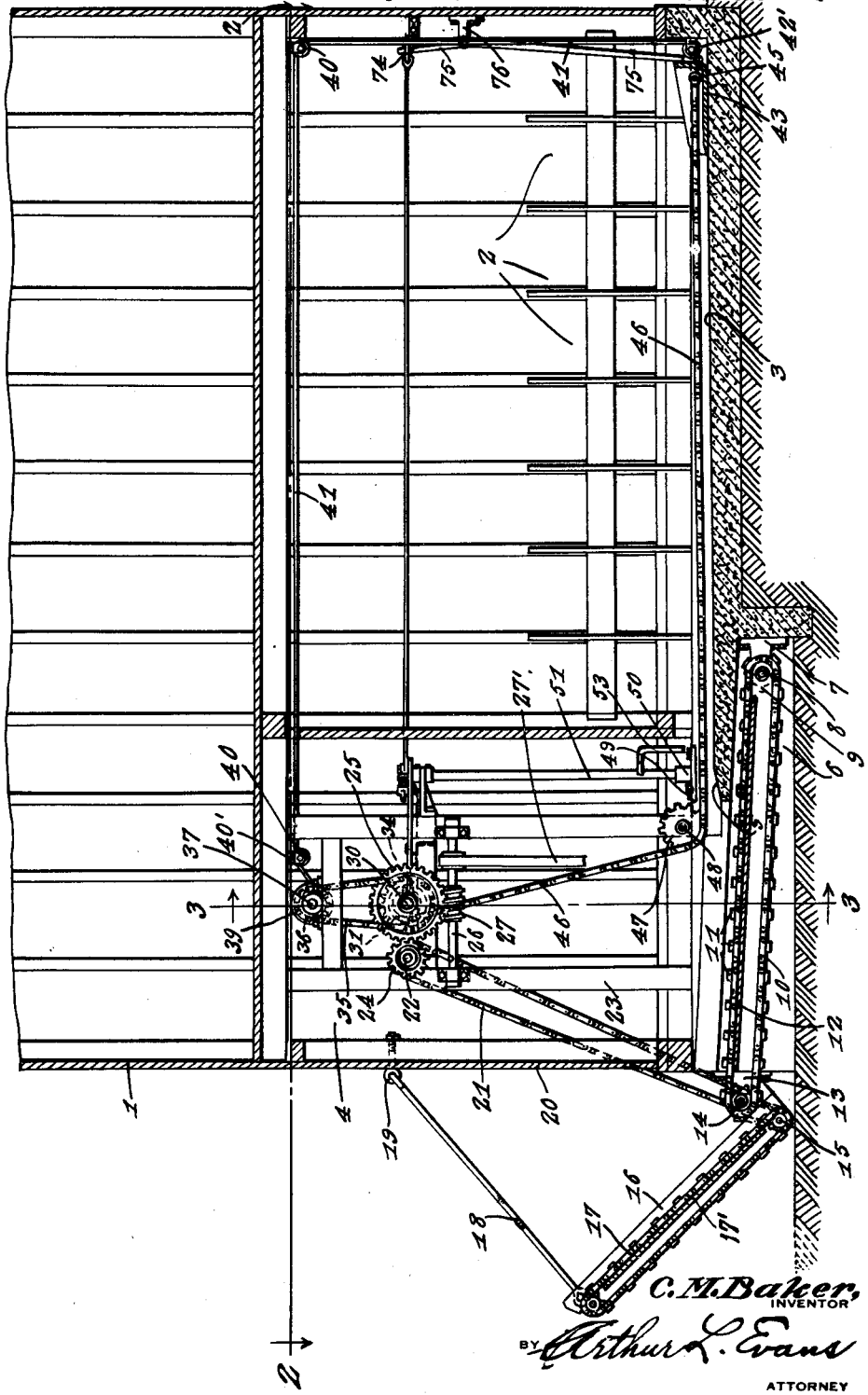
Figure 1 is an approximately longitudinal sectional view through a barn or stable equipped with the improvement.
Figure 2:
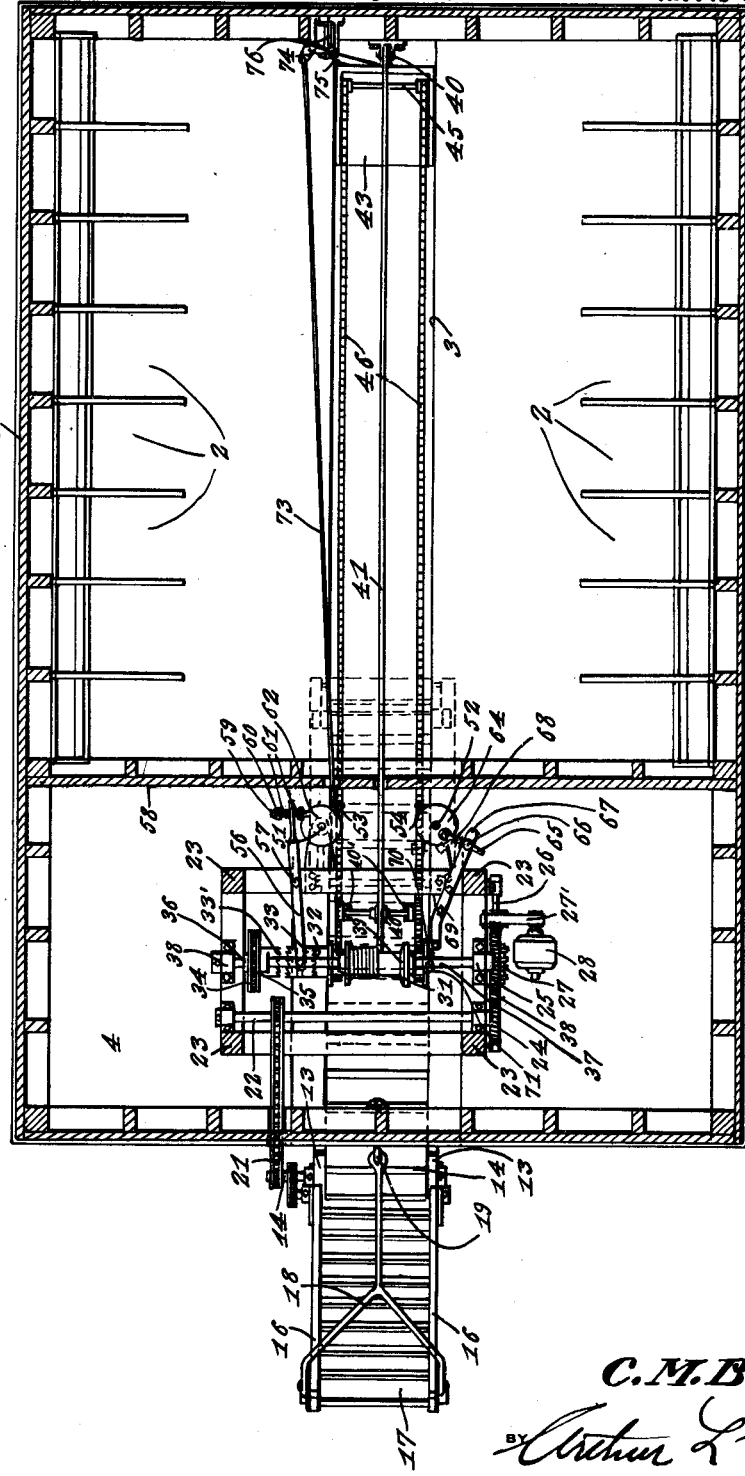
Figure 2 is a sectional view approximately on the line 2—2 of Figure 1.
Figure 3:
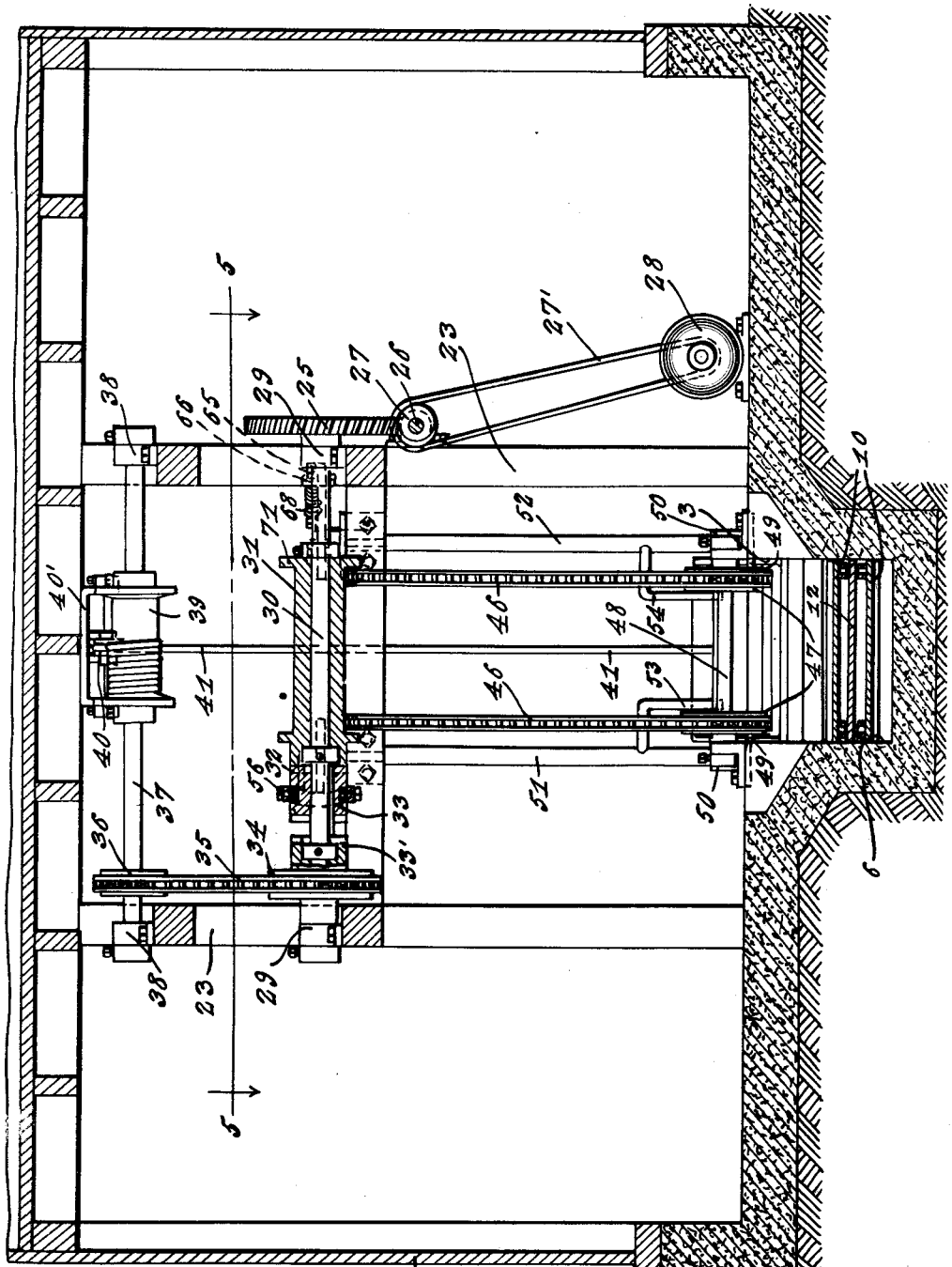
Figure 3 is an enlarged sectional view approximately on the line 3—3 of Figure 1.

The cow barn or stable is indicated broadly by the numeral 1 in the drawings, and the same may comprise a building of one or more stories. The floor of the stable proper is concreted and the same is provided with a number of stalls 2 for the animals. The floor of the stable is formed with a central longitudinally extending gutter 3 arranged a suitable distance beyond the outer ends of the stalls 2. The stable portion of the barn has at one of its ends a room or compartment 4 into which the lower inclined wall of the stall extends. As a matter-of-fact, the floor of the compartment 4 is preferably also of concrete, and the lower wall at the portion of the inclinder gutter that enters the compartment 4 is beveled or arranged at a further downward inclination, as indicated by the numeral 5. In a line with the gutter the floor of the compartment or room 4 is formed with a central depression which I shall term a pit and which is indicated by the numeral 6. The pit extends into the floor of the stable below the gutter, and the inner wall of the pit has fixed thereon bearing brackets 7 for a shaft 8 and fixed on this shaft there are spaced sprocket wheels 9 around which are trained endless sprocket chains 10, the links of the said chains being provided with flights 11 to travel over and to contact with the upper face of a board or plate 12. The pit at the outer end thereof is provided with other bearings 13 on which is journaled a shaft 14 carrying sprocket wheels over which the chains 10 are trained. The shaft 14 has fixed thereon another sprocket wheel which is disposed opposite a sprocket wheel that is fixed on a shaft 15 which is journaled between the side boards 16 of an endless elevator 17, and around these sprocket wheels there is trained an endless chain 18. The endless elevator is provided with flights, whereby the material delivered thereonto by the conveyor which constitutes the endless sprocket chains on the board or plate 12 may be elevated and delivered into a wagon or dump. The elevator has its upper face in contact with a board or plate 17' and is held at an inclination through the medium of a rod having forked ends which is pivoted thereto. This rod is indicated by the numeral 18 and has a hooked end to engage in an eye 19 on the outer wall of the room 4. Preferably the elevator may be swung to close an opening 20 in the said outer wall of the room 4 when the elevator is not in use.

On one of its ends there is fixed on the shaft 14 a sprocket wheel over which is trained an endless sprocket chain 21. The chain is also trained around a sprocket wheel which is fixed on a shaft 22 that is journaled transversely in a substantially rectangular frame 23 that is secured in the room 4, and whose corner posts are disposed to the opposite sides of the conveyor 10. On one end of the shaft 22 there is fixed a pinion 24, and this pinion is in mesh with a gear 25. Below the gear there is journaled in suitable bearings in two of the corner posts of the frame 23 a longitudinal shaft 26 on which is fixed a worm 27 that is in mesh with the teeth of the gear 25. Also fixed on the shaft 26 there is a wheel for a belt 27' and the belt is connected to the drive shaft of an electric or like motor 28 which is fastened to the floor or any other convenient place in the room 4.

There is, of course, a suitable switch control for the motor.

On two of the longitudinal beams for the frame 23 there are fixed alining bearings 29, respectively, for the shaft 30 of the worm gear 25. Journaled on the worm gear and held from longitudinal movement thereon there is a flanged drum 31. One end of the drum extends beyond one of the flanges thereof and the said end is formed with ratchet clutch teeth 32 designed to be engaged by similar teeth on one of the ends of a slidable clutch 33 which is movable on a spline carried by the shaft 30. The second clutch face of the clutch member 33 is designed to engage with the clutch face 33' of the hub of a belt or sprocket wheel 34, which is also journaled on the shaft 30 and held from longitudinal movement on said shaft. The sprocket or belt wheel 34 has trained thereover a sprocket belt 35, the same being trained over a wheel 36 that is fixed on a shaft 37 that has its ends journaled in bearings 38 on the upper side and longitudinal beams for the corner posts of the frame 23. The shaft 37 is held from longitudinal movement and has approximately centrally fixed thereon, above the drum 31, a spool 39. The spool has trained therearound and fixed thereto one end of a strong cord or cable 41. The cable is trained over grooved wheels 40 whose shafts are journaled in substantially inverted U-shaped hangers 40' respectively. One of the grooved wheels is located adjacent to the end of the stable opposite that provided with the room or compartment 4, so that the cable is trained downwardly from the said wheel and over a lower grooved wheel 42' which has its shaft journaled in a bearing bracket that is fixedly secured to what I will term the rear and straight wall of the gutter 3 and the end of the cable is fixedly secured to the rear or closed back portion of a scoop 43.

The scoop has journaled through suitable bearings adjacent to its rear and closed end a shaft 45 and to this shaft, and in a line with the sides of the scoop there are fixed strong flexible elements which are preferably in the nature of chains 46. The chains are guided under sprocket wheels 47 journaled on a shaft 48 which is fixed between two of the corner posts of the frame 23 and which sprocket wheels extend into the gutter at the outlet thereof, and likewise outwardly with respect to the determined inclined or flared bottom end wall 5 of the said gutter. The chains 46 are directed upwardly and are trained around and secured to the drum 31.

Directly above and approximately in a line with the center of the flared lower end wall 5 of the gutter there is fixed on the sides of the said gutter inwardly directed lugs 49 and outward of the lugs there are fixed on the wall of the room or compartment 4 oppositely disposed bearing sockets 50 for the reduced lower ends of vertically disposed rods 51 and 52, respectively. On each of the rods 51 and 52 there is fixed the upper angle end of a depending finger 53 and 54, respectively. The lower ends of these fingers are so positioned as to be contacted by the back of the scoop when the scoop is arranged in discharge position as disclosed by Figure 4 of the drawings.

The double faced slidable clutch member 31 is centrally formed with a continuous groove to receive therein pins or the like on the forked end of a lever 56 which is pivoted, as at 57, to one of the cross supporting beams for the frame 23. The lever has its free end, which is directly opposite the division wall 58, (between the stable and the room or compartment 4) preferably given a half turn and provided with an opening for a threaded rod 59. The rod has screwed thereon nuts 60 and contacting with these nuts and exerting a pressure against the opposite sides of the lever there are coiled expansion springs 61. The rod 59 has an offset end designed to be received in any one of a series of apertures in a disc 62 which is fixed on the upper end of the rod 51. The upper end of the rod turns in a suitable bearing bracket 63 which is fixed on the frame 23. The spring influenced rod which connects the lever to the disc is in the nature of a link.

The upper end of the rod 52 is also journaled through a suitable bearing bracket that extends from the frame 23 and the said end of the rod 52 has fixed thereon a disc 64. To the disc 64 there is pivotally connected the offset end of a rod 65 that passes through the head of a member 66 which is rotatably mounted on a brake lever 67. The short rod 65 has fixed thereon a stop element which is contacted by one end of a coil expansion spring 68, the second end of the spring bearing against the head 66. The brake rod 67 is pivoted, as at 69, to an element of the frame 23, and the inner or free end of the brake lever carries a brake shoe 70 to engage with the outer flange 71 of the drum 31 when the lever is swung in one direction. When the scoop is at the rear of the gutter the rods or shafts 51 and 52 will have been turned so that their fingers 53 and 54 will be disposed at inward angles in the gutter 3. The motor is put in operation, the slidable clutch being in engagement with the drum 31. This causes the chains 46 to be wound on the drum and likewise imparts a movement in an outward or delivery direction to the conveyor and to the elevator. However, before the motor is put in operation the attendant scoops the manure from the stalls into the gutter. When the scoop has moved through the gutter to a position disclosed by Figure 4 of the drawings, the upper edges at the sides thereof will be brought to contact with the lugs 49, thus tilting or canting the scoop so that the contents thereof will be delivered onto the conveyor and from the conveyor onto the elevator. When in this position the back of the scoop will have contacted with the fingers of the vertical shafts or rods 52 and 53, swinging the said rods to cause the shaft 52 to turn the disc 64 to actuate the brake lever to bring the brake shoe 70 against the flange 71 of the drum, preventing the turning of the drum. In the meantime the turning of the shaft 51 will have first brought the slidable clutch 31 to neutral position, that is, out of engagement with the clutch surfaces 32 and 33 on the drum 31, permitting of all the material being delivered from the scoop onto the conveyor. This lost motion of the slidable clutch is occasioned by the springs on the link or rod 59, but after momentarily retaining the clutch in neutral position it will snap into engagement with the clutch 33 on the wheel 34. This permits of the chain or belt 35 rotating the shaft 37 to wind the cable 41 on the spool 39 and returns the scoop to its initial position. When the finger 54 on the shaft or rod 52 is relieved from contact with the scoop the spring 64 on the rod or arm 65 will turn the disc 64 and the rod or shaft 52 to initial position, thus releasing the brake shoe 70 from engagement with the drum so that while the conveyor and elevator still operate in delivery directions the scoop is returned to its initial position in the gutter.

The switch controlling the motor may be shut off to stop the operation of the conveyor and elevator, but should it be found desirable that these parts, as well as the scoop be operated continuously for any determined length of time there may be attached to a disc 62 a longitudinally directed rod or like element 73. The rod is directed toward the rear of the gutter and is, of course, elevated above the stalls. The rod is pivotally connected to a bell crank lever 74 that is loosely pivoted at what I will term the rear of the stable and there is likewise loosely pivoted to the bell crank lever 74 a depending arm or lever 75. The lever is loosely pivoted to a bracket support 76. The lever extends into the gutter 3 and will be contacted by the scoop 43 when the same reaches the rear and closed end of the gutter and by virtue of such contact a longitudinal pull will be exerted on the rod 73 to cause the lever 56 to shift the clutch member 33 into engagement with the clutch surface 32 on the drum 31.

It is believed that when the foregoing description has been carefully read in connection with the drawings the construction and advantages of my improvement will be understood and appreciated by those skilled in the art to which such invention relates so that further detailed description will not be required.

Having described the invention, I claim:

1. A stable having a longitudinal gutter therein for the reception of refuse, and a scoop in the gutter, a motor, a train of gears operated by the motor, and having shafts, a drum freely mounted on one of the shafts, flexible elements connected to the drum and to the scoop, guide means for the flexible elements, said drum having a brake wheel and a clutch surface at its other end, a double faced clutch element splined for longitudinal movement on the shaft, a sprocket wheel freely mounted on the shaft, and having a clutch surface, a spool operated by the turning of the sprocket wheel, a flexible element wound around the spool and connected to the rear of the gutter, guide means for the flexible element, vertically disposed shafts arranged at the opposite sides of the gutter and having disc heads, a pivotally supported lever carrying a brake shoe to engage with the brake wheel, and having a flexible and spring influenced connection with one of the discs, a pivotally supported lever having a loose connection with a slidable clutch element and a rod connection with the disc of the second shaft, compensating springs between the end of the lever and the disc connecting element thereof, said shafts having angle fingers which depend into the gutter and which are in the path of contact with the scoop when the scoop is moved to dumping position and whereby the brake is applied to the drum, the clutch element shifted from the drum to the clutch surface on the sprocket wheel, when the scoop is in dumping position and means projecting into the trough to contact with the scoop to assist the dumping of the scoop.

2. A stable having a longitudinal gutter therein for the reception of refuse, and a scoop in the gutter, a motor, a train of gears operated by the motor and having shafts, a drum freely mounted on one of the shafts, flexible elements connected to the drum and to the scoop, guide means for the flexible elements, said drum having a brake wheel and a clutch surface at its other end, a double-faced clutch element splined for longitudinal movement on the shaft, a sprocket wheel freely mounted on the shaft, and having a clutch surface, a spool operated by the turning of the sprocket wheel, a flexible element wound around the spool and connected to the rear of the gutter, guide means for the flexible element, vertically disposed shafts arranged at the opposite sides of the gutter and having disc heads, a pivotally supported lever carrying a brake shoe to engage with the brake wheel, and having a flexible and spring influenced connection with one of the discs, a pivotally supported lever having a loose connection with a slidable clutch element and a rod connection with the disc of the second shaft, compensating springs between the end of the lever and the disc connecting element thereof, said shafts having angle fingers which depend into the gutter and which are in the path of contact with the scoop when the scoop is moved to dumping position and whereby the brake is applied to the drum, the clutch element shifted from the drum to the clutch surface on the sprocket wheel, when the scoop is in dumping position and means projecting into the gutter to contact with the scoop to assist the dumping of the scoop and means operated by the contact of the scoop to its initial position for turning one of the shafts to operate the clutch lever to bring the clutch thereof into engagement with the clutch of the drum.

In testimony whereof I affix my signture.

CHARLES M. BAKER.